United States Patent
Zhong et al.

(10) Patent No.: US 11,221,717 B2
(45) Date of Patent: Jan. 11, 2022

(54) TOUCH SUBSTRATE, MANUFACTURING METHOD AND DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Tengfei Zhong, Beijing (CN); Jian Tian, Beijing (CN); Xiaodong Xie, Beijing (CN); Bin Pang, Beijing (CN); Tianyu Zhang, Beijing (CN); Xinxiu Zhang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/646,918

(22) PCT Filed: Sep. 4, 2019

(86) PCT No.: PCT/CN2019/104337
§ 371 (c)(1),
(2) Date: Mar. 12, 2020

(87) PCT Pub. No.: WO2020/140466
PCT Pub. Date: Jul. 9, 2020

(65) Prior Publication Data
US 2021/0216167 A1    Jul. 15, 2021

(30) Foreign Application Priority Data

Jan. 4, 2019 (CN) .......................... 201910006797.9

(51) Int. Cl.
G06F 3/044 (2006.01)

(52) U.S. Cl.
CPC .......... G06F 3/0445 (2019.05); G06F 3/0446 (2019.05); *G06F 2203/04103* (2013.01); *G06F 2203/04112* (2013.01)

(58) Field of Classification Search
CPC ................. G06F 3/0445; G06F 3/0446; G06F 2203/04103; G06F 2203/04112
See application file for complete search history.

(56) References Cited

U.S. PATENT DOCUMENTS

| 2012/0092296 A1 | 4/2012 | Yanase et al. |
| 2014/0022466 A1 | 1/2014 | Lo et al. |

(Continued)

FOREIGN PATENT DOCUMENTS

| CN | 104571768 A | 4/2015 |
| CN | 106201144 A | 12/2016 |

(Continued)

OTHER PUBLICATIONS

First Office Action for Chinese Application No. 201910006797.9, dated Mar. 2, 2020, 5 Pages.

(Continued)

*Primary Examiner* — Md Saiful A Siddiqui
(74) *Attorney, Agent, or Firm* — Brooks Kushman P.C.

(57) ABSTRACT

A touch substrate includes a touch region provided with touch electrodes, and a peripheral region surrounding the touch region and provided with at least one line arranged at a same layer as the touch electrodes. The touch electrodes include a first touch electrode and a second touch electrode arranged at a periphery of the touch region at a same side. A sum of parasitic capacitances generated between the first touch electrode and the at least one line at an adjacent part of the peripheral region is a first total parasitic capacitance, a sum of parasitic capacitances generated between the second touch electrode and the at least one line at the (Continued)

adjacent part of the peripheral region is a second total parasitic capacitance, and an absolute value of a difference between the first total parasitic capacitance and the second total parasitic capacitance is smaller than or equal to a threshold.

14 Claims, 6 Drawing Sheets

(56) References Cited

U.S. PATENT DOCUMENTS

| | | | | |
|---|---|---|---|---|
| 2015/0212609 A1* | 7/2015 | Tung | ............... | B05D 5/00 345/174 |
| 2016/0246405 A1* | 8/2016 | Hu | ............... | G06F 3/0446 |
| 2016/0313860 A1* | 10/2016 | Ono | ............... | G06F 3/0418 |
| 2016/0370944 A1 | 12/2016 | Zhao et al. | | |
| 2018/0299985 A1 | 10/2018 | Wang et al. | | |
| 2019/0107908 A1* | 4/2019 | Zeng | ............... | G06F 3/0445 |
| 2020/0212114 A1* | 7/2020 | Song | ............... | G06F 3/0446 |

FOREIGN PATENT DOCUMENTS

| | | |
|---|---|---|
| CN | 107436696 A | 12/2017 |
| CN | 107885389 A | 4/2018 |
| CN | 109683751 A | 4/2019 |

OTHER PUBLICATIONS

International Search Report and Written Opinion for Application No. PCT/CN2019/104337, dated Dec. 4, 2019, 9 Pages.

\* cited by examiner

(PRIOR ART)

Fig. 1

(PRIOR ART)

Fig. 2

(PRIOR ART)

Fig. 3

(PRIOR ART)

Fig. 4

(PRIOR ART)

TOUCH SUBSTRATE, MANUFACTURING METHOD AND DISPLAY DEVICE

CROSS-REFERENCE TO RELATED APPLICATIONS

This application is the U.S. national phase of PCT Application No. PCT/CN2019/104337 filed on Sep. 4, 2019, which claims priority to Chinese Patent Application No. 201910006797.9 filed on Jan. 4, 2019, which are incorporated herein by reference in their entireties.

TECHNICAL FIELD

The present disclosure relates to the field of touch technology, in particular to a touch substrate, a manufacturing method and a display device.

BACKGROUND

In the related art, a touch substrate includes a touch region provided with touch electrodes, and a peripheral region surrounding the touch region and provided with signal lines. A parasitic capacitance may be generated between a touch electrode at a periphery of the touch region and the corresponding signal line, and due to the effect of the parasitic capacitance, linearity of the touch electrode at the periphery of the touch region may be reduced, so a touch effect of the touch substrate may be adversely affected.

SUMMARY

In one aspect, the present disclosure provides in some embodiments a touch substrate, including a touch region provided with touch electrodes, and a peripheral region surrounding the touch region and provided with at least one line arranged at a same layer as the touch electrodes. The touch electrodes include a first touch electrode and a second touch electrode arranged at a periphery of the touch region at a same side, a sum of parasitic capacitances generated between the first touch electrode and the at least one line at an adjacent part of the peripheral region is a first total parasitic capacitance, a sum of parasitic capacitances generated between the second touch electrode and the at least one line at the adjacent part of the peripheral region is a second total parasitic capacitance, and an absolute value of a difference between the first total parasitic capacitance and the second total parasitic capacitance is smaller than or equal to a threshold.

In a possible embodiment of the present disclosure, the touch electrodes include driving electrodes and sensing electrodes arranged at different layers, and the at least one line includes at least one first line and at least one second line. The peripheral region is provided with the at least one first line arranged at a same layer as the driving electrodes, the driving electrodes include a first driving electrode and a second driving electrode at the periphery of the touch region at a same side, and an absolute value of a difference between the first total parasitic capacitance of the first driving electrode and the second total parasitic capacitance of the second driving electrode is smaller than or equal to the threshold; and/or the peripheral region is provided with the at least one second line arranged at a same layer as the sensing electrodes, the sensing electrodes include a first sensing electrode and a second sensing electrode at the periphery of the touch region at a same side, and an absolute value of a difference between the first total parasitic capacitance of the first sensing electrode and the second total parasitic capacitance of the second sensing electrode is smaller than or equal to the threshold.

In a possible embodiment of the present disclosure, the threshold is 0.01 F.

In a possible embodiment of the present disclosure, the total parasitic capacitances between all the touch electrodes at the periphery of the touch region at the same side and the at least one line at an adjacent part of the peripheral region are substantially the same.

In a possible embodiment of the present disclosure, the lines are evenly arranged at the peripheral region, and the adjacent lines are spaced apart from each other at a substantially same interval.

In a possible embodiment of the present disclosure, a quantity of lines crossing an extension line of each first touch electrode is the same as a quantity of lines crossing an extension line of each second touch electrode in a direction away from a center of the touch region.

In a possible embodiment of the present disclosure, the lines include at least one ground line and touch signal lines connected to each touch electrode, and the touch signal lines are connected to a touch circuit at the peripheral region. The touch electrodes are arranged in n rows in a direction close to the touch circuit, and the lines crossing an extension line of the touch electrode in a $k^{th}$ row include n+1−k ground lines and k touch signal lines, where n is an integer greater than 1, and k is an integer greater than 0 and smaller than or equal to n; and/or the touch electrodes are arranged in m columns in the direction close to the touch circuit, and the lines crossing an extension line of the touch electrode in a $k^{th}$ column include m+1−k ground lines and k touch signal lines, where m is an integer greater than 1, and k is an integer greater than 0 and smaller than or equal to m.

In a possible embodiment of the present disclosure, the n+1−k ground lines and the k touch signal lines include a first line, a second line, ..., and an $(n+1)^{th}$ line sequentially in the direction away from the center of the touch region, a distance between each touch electrode and the corresponding first line is $d_1$, a distance between each touch electrode and the corresponding second line is $d_2$, ..., and a distance between each touch electrode and the corresponding $(n+1)^{th}$ line is $d_{n+1}$. The lines corresponding to each touch electrode cross the extension line of the touch electrode.

In a possible embodiment of the present disclosure, the total parasitic capacitances generated between the driving electrodes at the periphery of the touch region and the lines at a right part of the peripheral region are substantially the same.

In a possible embodiment of the present disclosure, the total parasitic capacitances generated between the driving electrodes at the periphery of the touch region and the lines at a left part of the peripheral region are substantially the same.

In a possible embodiment of the present disclosure, the total parasitic capacitances generated between the driving electrodes at the periphery of the touch region and the lines at a lower part of the peripheral region are substantially the same.

In a possible embodiment of the present disclosure, each touch electrode is of a One Glass Metal Mesh (OGM) structure.

In a possible embodiment of the present disclosure, each touch electrode is a block-like electrode made of a transparent conductive material.

In a possible embodiment of the present disclosure, each touch electrode is a block-like electrode made of Indium Tin Oxide (ITO).

In another aspect, the present disclosure provides in some embodiments a display device, including the above-mentioned touch substrate, a flexible circuit board, a printed circuit board and a back plate.

In yet another aspect, the present disclosure provides in some embodiments a method of manufacturing a touch substrate. The touch substrate includes a touch region provided with touch electrodes, and a peripheral region surrounding the touch region, and the touch electrodes include a first touch electrode and a second touch electrode arranged at an adjacent part of a periphery of the touch region at a same side. The method includes forming at least one line at the peripheral region and a same layer as the touch electrodes, so that an absolute value of a difference between a first total parasitic capacitance and a second total parasitic capacitance is smaller than or equal to a threshold. A sum of parasitic capacitances generated between the first touch electrode and the at least one line at an adjacent part of the peripheral region is the first total parasitic capacitance, and a sum of parasitic capacitances generated between the second touch electrode and the at least one line at the adjacent part of the peripheral region is the second total parasitic capacitance.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments.

Figure 1:
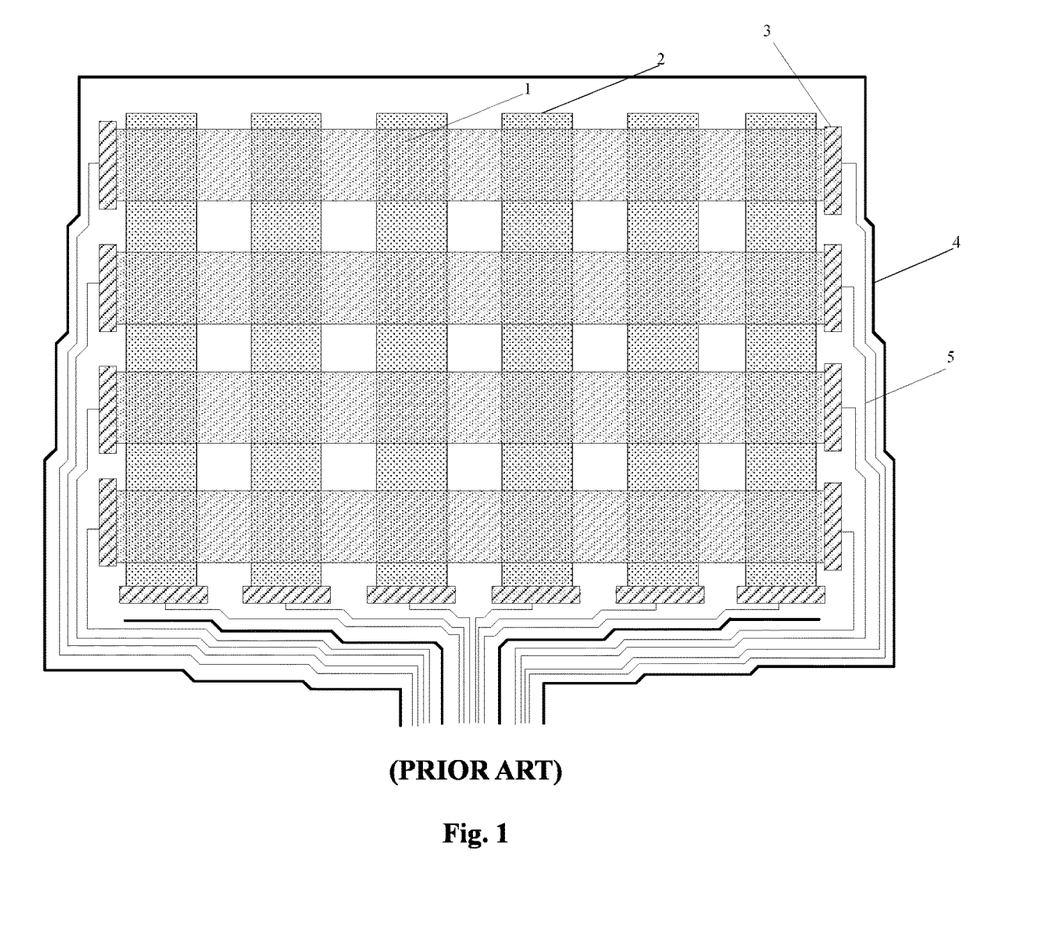
FIGS. 1-5 are schematic views of a touch substrate in a related art.
Figure 2:
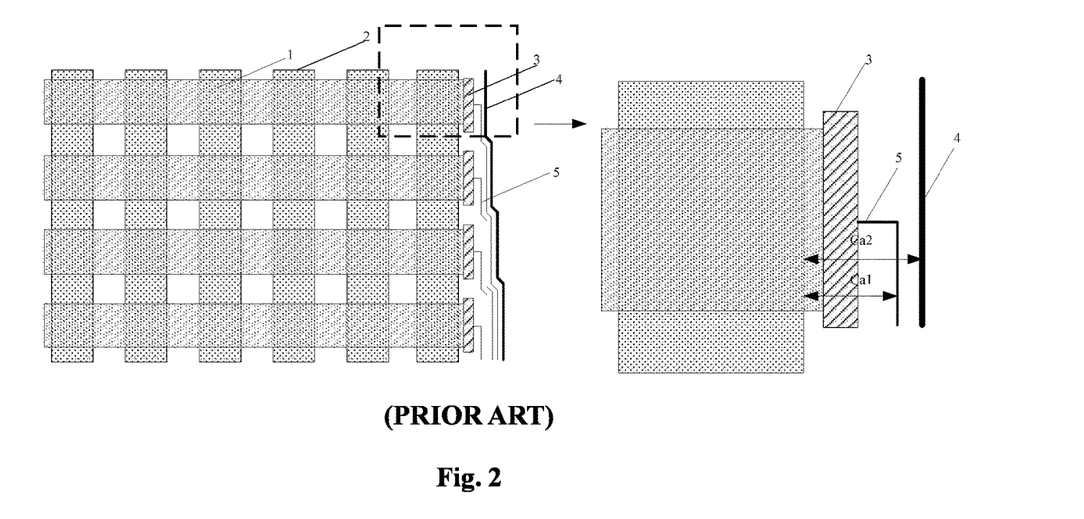
Figure 3:
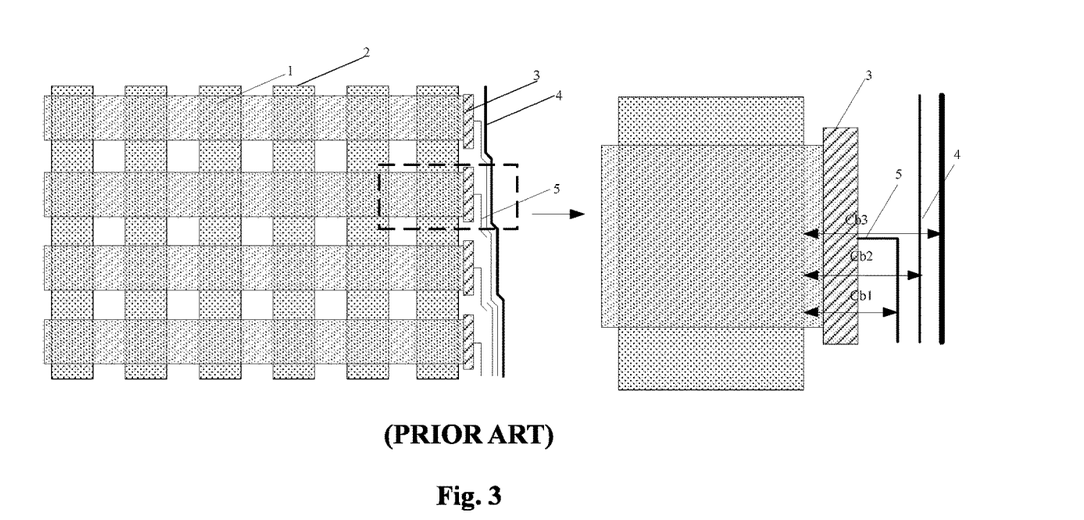
Figure 4:
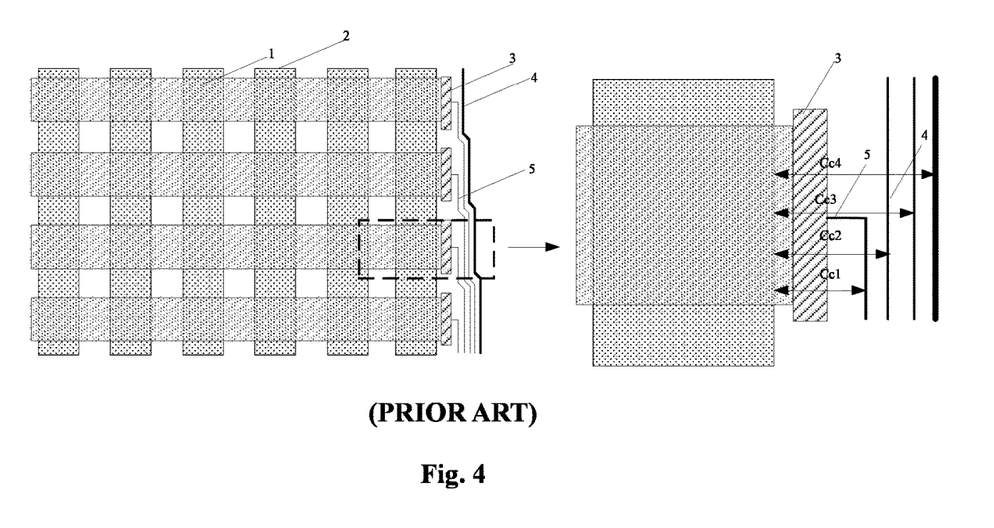
Figure 5:
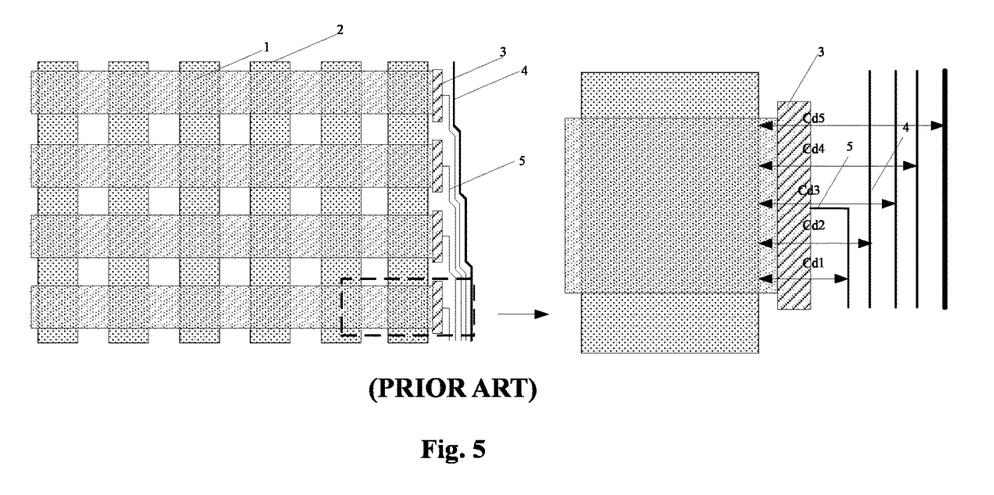

A conventional touch substrate includes a touch region located at a center of the touch substrate and a peripheral region surrounding the touch region. As shown in FIG. 1, driving electrodes 1 and sensing electrodes 2 each crossing the driving electrodes 1 may be arranged at the touch region, with the driving electrodes 1 being arranged in rows and the sensing electrodes 2 being arranged in columns. The peripheral region is provided with signal lines, which include a ground line 4 and touch signal lines 5 each electrically connected to the corresponding touch electrode. Each touch signal line 5 is connected to the corresponding touch electrode via a connection block 3. A parasitic capacitance may be generated between each touch electrode at a periphery of the touch region and each signal line. In FIG. 2, a right view is an enlarged view of a portion surrounded by a dotted box in a left view. As shown in FIG. 2, the total parasitic capacitance generated between the driving electrode 1 in a first row and the touch signal lines is $Ca=Ca1+Ca2$, where $Ca1$ represents a parasitic capacitance generated between the driving electrode 1 in the first row and the touch signal line 5, and $Ca2$ represents a parasitic capacitance between the driving electrode 1 in the first row and the ground line 4. In FIG. 3, a right view is an enlarged view of a portion surrounded by a dotted box in a left view. As shown in FIG. 3, the total parasitic capacitance generated between the driving electrode 1 in a second row and the touch signal lines is $Cb=Cb1+Cb2+Cb3$, where $Cb1$ represents a parasitic capacitance generated between the driving electrode 1 in the second row and the touch signal line 5 closer to the driving electrode 1 in the second row, $Cb2$ represents a parasitic capacitance between the driving electrode 1 in the second row and another touch signal line 5, and $Cb3$ represents a parasitic capacitance between the driving electrode 1 in the second row and the ground line 4. In FIG. 4, a right view is an enlarged view of a portion surrounded by a dotted box in a left view. As shown in FIG. 4, the total parasitic capacitance generated between the driving electrode 1 in a third row and the touch signal lines is $Cc=Cc1+Cc2+Cc3+C4$, where $Cc1$ represents a parasitic capacitance generated between the driving electrode 1 in the third row and the touch signal line 5 closest to the driving electrode 1 in the third row, $Cc2$ represents a parasitic capacitance between the driving electrode 1 in the third row and the second closest touch signal line 5, $Cc3$ represents a parasitic capacitance between the driving electrode 1 in the third row and the third closest touch signal line 5, and $Cc4$ represents a parasitic capacitance between the driving electrode 1 in the third row and the ground line 4. In FIG. 5, a right view is an enlarged view of a portion surrounded by a dotted box in a left view. As shown in FIG. 5, the total parasitic capacitance generated between the driving electrode 1 in a fourth row and the touch signal lines is $Cd=Cd1+Cd2+Cd3+Cd4+Cd5$, where $Cd1$ represents a parasitic capacitance generated between the driving electrode 1 in the fourth row and the touch signal line 5 closest to the driving electrode 1 in the fourth row, $Cd2$ represents a parasitic capacitance between the driving electrode 1 in the fourth row and the second closest touch signal line 5, $Cd3$ represents a parasitic capacitance between the driving electrode 1 in the fourth row and the third closest touch signal line 5, $Cd4$ represents a parasitic capacitance between the driving electrode 1 in the fourth row and the fourth closest touch signal line 5, and $Cc5$ represents a parasitic capacitance between the driving electrode 1 in the fourth row and the ground line 4. $Ca<Cb<Cc<Cd$. It can be seen that, the signal lines are arranged at the peripheral region in an uneven manner, so the total parasitic capacitances between the touch electrodes and the signal lines at the periphery of the touch region may be different. As a result, the insufficient linearity may occur for the touch electrodes at the periphery of the touch region, and thereby a touch effect of the touch substrate may be adversely affected.

An object of the present disclosure is to provide a touch substrate, a manufacturing method and a display device, so as to improve the linearity of the touch electrodes at the periphery of the touch substrate, thereby to improve the touch effect of the touch substrate.

The present disclosure provides in some embodiments a touch substrate, including a touch region provided with touch electrodes, and a peripheral region surrounding the touch region and provided with at least one line arranged at a same layer as the touch electrodes. The touch electrodes include a first touch electrode and a second touch electrode arranged at a periphery of the touch region at a same side.

A sum of parasitic capacitances generated between the first touch electrode and the at least one line at an adjacent part of the peripheral region is a first total parasitic capacitance, a sum of parasitic capacitances generated between the second touch electrode and the at least one line at the adjacent part of the peripheral region is a second total parasitic capacitance, and an absolute value of a difference between the first total parasitic capacitance and the second total parasitic capacitance is smaller than or equal to a threshold.

According to the embodiments of the present disclosure, the absolute value of the difference between the total parasitic capacitances generated between different touch electrodes and the at least one line at the peripheral region may be smaller than or equal to the threshold. As a result, it is able to reduce the difference between the parasitic capacitances generated between the lines at the peripheral region and the touch electrodes at the periphery of the touch region, i.e., to make the parasitic capacitances generated between the lines at the peripheral region and the touch electrodes at the periphery of the touch region to be substantially the same, thereby to improve the linearity of the touch electrodes at the periphery of the touch region of the touch substrate and improve the touch effect of the touch substrate.

The touch substrate in the embodiments of the present disclosure may be a mutually-capacitive touch substrate or a self-capacitive touch substrate. When the touch substrate is the mutually-capacitive touch substrate, the touch electrodes may include driving electrodes and sensing electrodes arranged at different layers, and the at least one line may include first lines and second lines. The peripheral region may be provided with at least one first line arranged at a same layer as the driving electrodes, the driving electrodes may include a first driving electrode and a second driving electrode at the periphery of the touch region at a same side, and an absolute value of a difference between the first total parasitic capacitance of the first driving electrode and the second total parasitic capacitance of the second driving electrode may be smaller than or equal to the threshold; and/or the peripheral region may be provided with at least one second line arranged at a same layer as the sensing electrodes, the sensing electrodes may include a first sensing electrode and a second sensing electrode at the periphery of the touch region at a same side, and an absolute value of a difference between the first total parasitic capacitance of the first sensing electrode and the second total parasitic capacitance of the second sensing electrode may be smaller than or equal to the threshold.

When the absolute value of the difference between the total parasitic capacitance generated between the first driving electrode and the at least one first line at the peripheral region and the total parasitic capacitance generated between the second driving electrode and the at least one first line at the peripheral region is smaller than or equal to the threshold, it is able to effectively reduce the difference between the parasitic capacitances generated between the lines at the peripheral region and the driving electrodes at the periphery of the touch region, thereby to improve the linearity of the driving electrodes.

When the absolute value of the difference between the total parasitic capacitance generated between the first sensing electrode and the at least one second line at the peripheral region and the total parasitic capacitance generated between the second sensing electrode and the at least one second line at the peripheral region is smaller than or equal to the threshold, it is able to effectively reduce the difference between the parasitic capacitances generated between the lines at the peripheral region and the sensing electrodes at the periphery of the touch region, thereby to improve the linearity of the sensing electrodes.

To be specific, the threshold may be 0.01 F, so as to make the parasitic capacitances generated between the lines at the peripheral region and the touch electrodes at the periphery of the touch region to be substantially the same, thereby to significantly improve the linearity of the touch electrodes at the periphery of the touch region and improve the touch effect of the touch substrate.

In some embodiments of the present disclosure, the total parasitic capacitances between all the touch electrodes at the periphery of the touch region at the same side and the at least one line at the peripheral region may be substantially the same. Here, it should be appreciated that, when the total parasitic capacitances are substantially the same, it means that they may be completely the same, or the difference between any two of them may be smaller than 5% or even 2%.

In some embodiments of the present disclosure, the lines may be arranged evenly at the peripheral region, and extension lines of all touch electrodes may cross the lines in a same amount in a direction away from a center of the touch region. In this way, through setting a size of each line and an interval between the adjacent lines, it is able to make the total parasitic capacitances generated between all the touch electrodes at the periphery of the touch region at the same side and the lines at the peripheral region to be substantially the same, or the same.

In a possible embodiment of the present disclosure, the lines may include at least one ground line and touch signal lines connected to each touch electrode, and the touch signal lines may be connected to a touch circuit at the peripheral region. The touch electrodes may be arranged in n rows in a direction close to the touch circuit, and the lines crossing an extension line of the touch electrode in a $k^{th}$ row may include n+1−k ground lines and k touch signal lines, where n is an integer greater than 1, and k is an integer greater than 0 and smaller than or equal to n; and/or the touch electrodes may be arranged in m columns in the direction close to the touch circuit, and the lines crossing an extension line of the touch electrode in a $k^{th}$ column may include m+1−k ground lines and k touch signal lines, where m is an integer greater than 1, and k is an integer greater than 0 and smaller than or equal to m.

When the touch electrodes are arranged in rows, due to different distances between the touch electrodes and the touch circuit, a wiring density of the touch signal lines may increase gradually in the direction close to the touch circuit. For example, the touch electrodes may be ranked in accordance with the distances between the touch electrodes and the touch circuit, a touch electrode furthest from the touch circuit may be a touch electrode in a first row, and a touch electrode closest to the touch circuit may be the touch electrode in an $n^{th}$ row. At this time, one touch signal line may be provided at the peripheral region adjacent to the touch electrode in the first row, k touch signal lines may be arranged at the peripheral region adjacent to the touch electrode in a $k^{th}$ row, and n touch signal lines may be arranged at the peripheral region adjacent to the touch electrode in an $n^{th}$ row. In other words, the touch signal lines may be arranged in an uneven manner, so the total parasitic capacitances generated between the touch electrodes at the periphery of the touch region and the signal lines may be different from each other. In the embodiments of the present disclosure, the ground lines may be added at a region where the wiring density of the touch signal lines is relatively small, so as to improve the uniformity of the lines at the peripheral region.

When the touch electrodes are arranged in columns, due to different distances between the touch electrodes and the touch circuit, a wiring density of the touch signal lines may increase gradually in the direction close to the touch circuit. For example, the touch electrodes may be ranked in accordance with the distances between the touch electrodes and the touch circuit, a touch electrode furthest from the touch circuit may be a touch electrode in a first column, and a touch electrode closest to the touch circuit may be the touch electrode in an $n^{th}$ column. At this time, one touch signal line may be provided at the peripheral region adjacent to the touch electrode in the first column, k touch signal lines may be arranged at the peripheral region adjacent to the touch electrode in a $k^{th}$ column, and n touch signal lines may be arranged at the peripheral region adjacent to the touch electrode in an $n^{th}$ column. In other words, the touch signal lines may be arranged in an uneven manner, so the total parasitic capacitances generated between the touch electrodes at the periphery of the touch region and the signal lines may be different from each other. In the embodiments of the present disclosure, the ground lines may be added at a region where the wiring density of the touch signal lines is relatively small, so as to improve the uniformity of the lines at the peripheral region.

As compared with the related art where merely one ground line is provided at the peripheral region, in the embodiments of the present disclosure, more ground lines may be provided, so it is able to increase an electrostatic discharge (ESD) capability of the touch substrate, thereby to improve an ESD resistance capability of the touch substrate.

To be specific, the n+1−k ground lines and the k touch signal lines may include a first line, a second line, . . . , and an $(n+1)^{th}$ line sequentially in the direction away from the center of the touch region, a distance between each touch electrode and the corresponding first line may be $d_1$, a distance between each touch electrode and the corresponding second line may be $d_2$, . . . , and a distance between each touch electrode and the corresponding $(n+1)^{th}$ line may be $d_{n+1}$. A value of the parasitic capacitance generated between each touch electrode and the line at the peripheral region mainly depends on the distance between the touch electrode and the line. Through the design of the arrangement of the lines, it is able to make the distances between each touch electrode and the first line, the second line, . . . , and the $(n+1)^{th}$ line to be substantially the same, and make the parasitic capacitances generated between each touch electrode and the first line, the second line, . . . , and the $(n+1)^{th}$ line to be substantially the same, thereby to enable the total parasitic capacitances between the touch electrodes and the lies at the peripheral region to be substantially the same.

Figure 6:
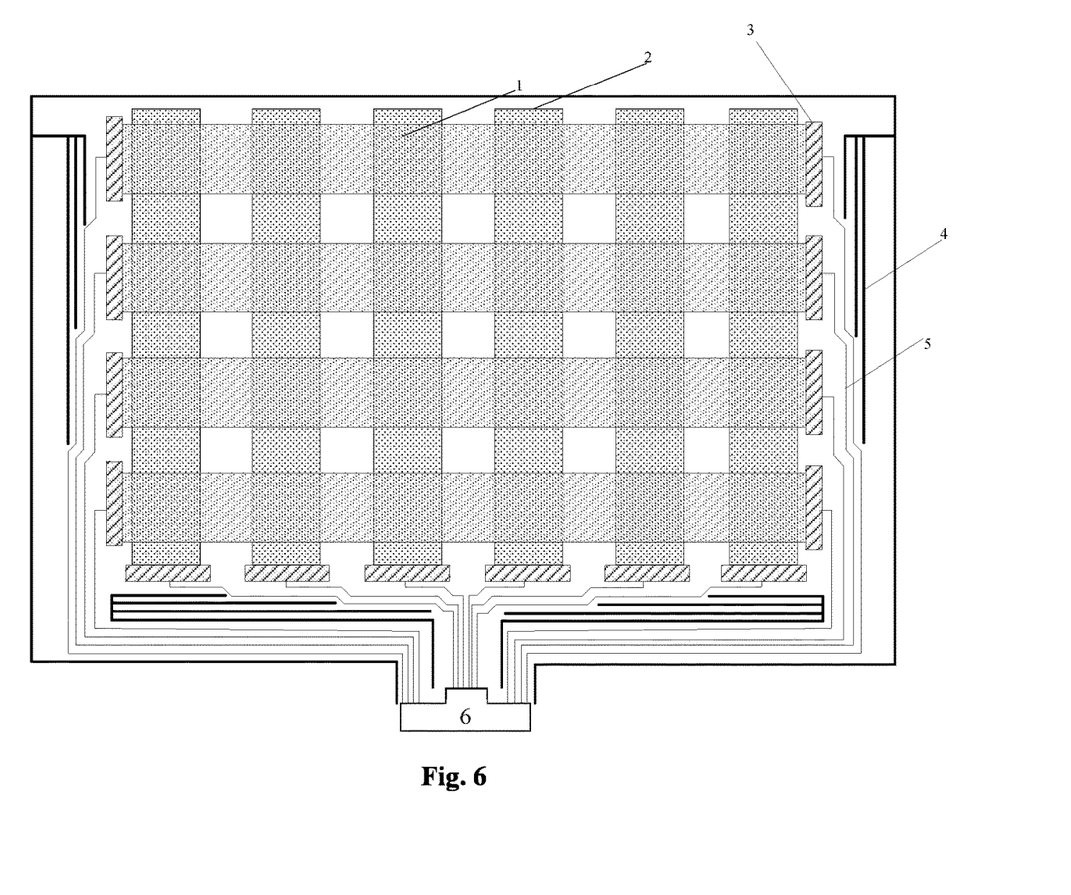
FIGS. 6-10 are schematic views showing a touch substrate according to one embodiment of the present disclosure.

As shown in FIG. 6, the touch region may be provided with the driving electrodes 1 and the sensing electrodes 2 each crossing the driving electrodes 1. The driving electrodes 1 may be arranged in rows and the sensing electrodes 2 may be arranged in columns. The peripheral region may be provided with the signal lines, and the signal lines may include the touch signal lines 5 each connected to the corresponding touch electrode and the ground lines 4. Each touch signal line 5 may be connected to the corresponding touch electrodes (the driving electrode 1 and the sensing electrode 2) via the connection block 3.

As shown in FIG. 6, when the touch substrate includes the driving electrodes 1 arranged in four rows and the touch circuit 6 is arranged below the driving electrode 1 in a last row, one touch signal line 5 and four ground lines 4 may be arranged at the peripheral region to the right of the driving electrode 1 in the first row, two touch signal lines 5 and three ground lines 4 may be arranged at the peripheral region to the right of the driving electrode 1 in the second row, three touch signal lines 5 and two ground lines 4 may be arranged at the peripheral region to the right of the driving electrode 1 in the third row, and four touch signal lines 5 and one ground line 4 may be arranged at the peripheral region to the right of the driving electrode 1 in the fourth row. In addition, in the direction away from the center of the touch region, a first touch signal line 5 corresponding to the driving electrode 1 in the first row, a first touch signal line 5 corresponding to the driving electrode 1 in the second row, a first touch signal line 5 corresponding to the driving electrode 1 in the third row and a first touch signal line 5 corresponding to the driving electrode 1 in the fourth row may be substantially along a same straight line. A first ground line 4 corresponding to the driving electrode 1 in the first row, a second touch signal line 5 corresponding to the driving electrode 1 in the second row, a second touch signal line 5 corresponding to the driving electrode 1 in the third row and a second touch signal line 5 corresponding to the driving electrode 1 in the fourth row may be substantially along a same straight line. A second ground line 4 corresponding to the driving electrode 1 in the first row, the first ground line 4 corresponding to the driving electrode 1 in the second row, a third touch signal line 5 corresponding to the driving electrode 1 in the third row and a third touch signal line 5 corresponding to the driving electrode 1 in the fourth row may be substantially along a same straight line. A third ground line 4 corresponding to the driving electrode 1 in the first row, the second ground line 4 corresponding to the driving electrode 1 in the second row, the first ground line 4 corresponding to the driving electrode 1 in the third row and a fourth touch signal line 5 corresponding to the driving electrode 1 in the fourth row may be substantially along a same straight line. A fourth ground line 4 corresponding to the driving electrode 1 in the first row, the third ground line 4 corresponding to the driving electrode 1 in the second row, the second ground line 4 corresponding to the driving electrode 1 in the third row and the first ground line 4 corresponding to the driving electrode 1 in the fourth row may be substantially along a same straight line.

Figure 7:
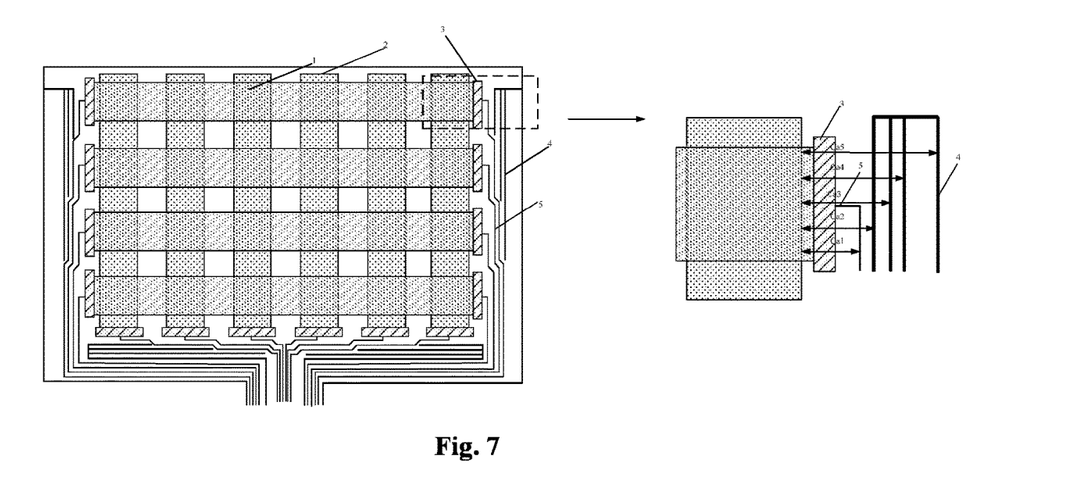
Figure 8:
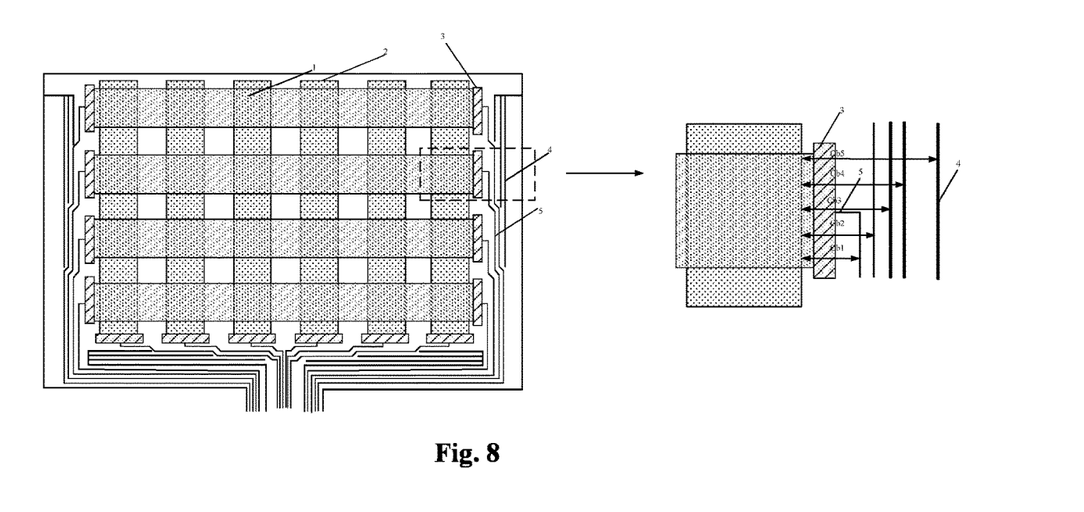
Figure 9:
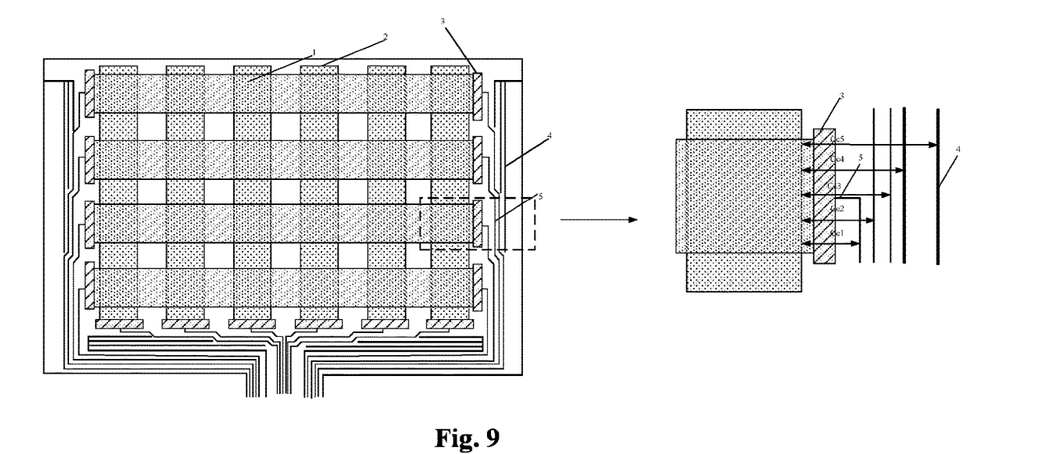
Figure 10:
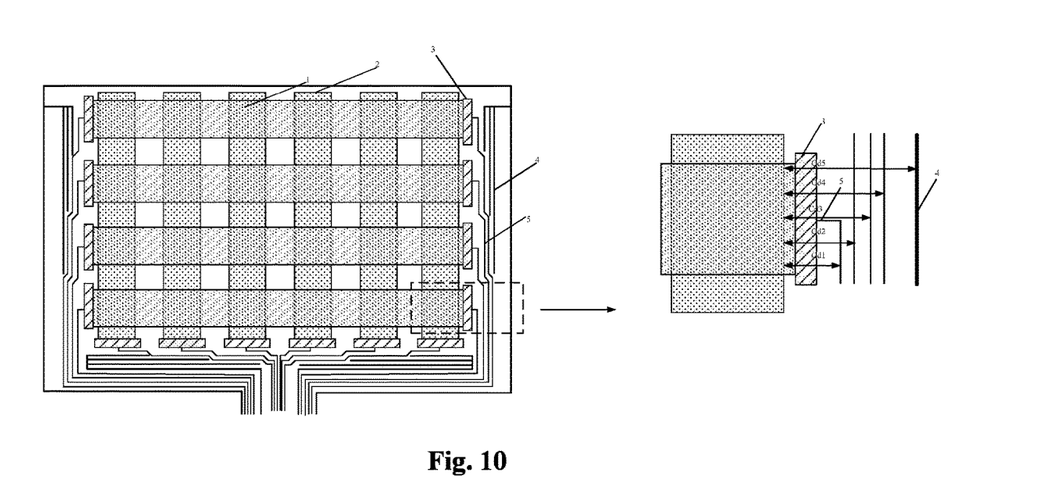

In FIG. 7, aright view is an enlarged view of a portion surrounded by a dotted box in a left view. As shown in FIG. 7, a total parasitic capacitance generated between the driving electrode 1 in the first row and the signal lines may be Ca=Ca1+Ca2+Ca3+Ca4+Ca5, where Ca1 represents a parasitic capacitance between the driving electrode 1 in the first row and the touch signal line 5, and Ca2, Ca3, Ca4 and Ca5 are each a parasitic capacitance between the driving electrode 1 in the first row and the corresponding ground line 4. In FIG. 8, a right view is an enlarged view of a portion surrounded by a dotted box in a left view. As shown in FIG. 8, a total parasitic capacitance generated between the driving electrode 1 in the second row and the signal lines may be Cb=Cb1+Cb2+Cb3+Cb4+Cb5, where Cb1 and Cb2 each represent a parasitic capacitance between the driving electrode 1 in the second row and the corresponding touch signal line 5, and Cb3, CM and Cb5 are each a parasitic capacitance between the driving electrode 1 in the second row and the corresponding ground line 4. As shown in FIG. 9, a total parasitic capacitance generated between the driving electrode 1 in the third row and the signal lines may be Cc=Cc1+Cc2+Cc3+Cc4+Cc5, where Cc1, Cc2 and Cc3 each represent a parasitic capacitance between the driving electrode 1 in the third row and the corresponding touch signal line 5, and Cc4 and Cc5 are each a parasitic capacitance between the driving electrode 1 in the third row and the corresponding ground line 4. As shown in FIG. 10, a total parasitic capacitance generated between the driving electrode 1 in the fourth row and the signal lines may be Cd=Cd1+Cd2+Cd3+Cd4+Cd5, where Cd1, Cd2, Cd3 and Cd4 each represent a parasitic capacitance between the driving electrode 1 in the fourth row and the corresponding touch signal line 5, and Cd5 is a parasitic capacitance between the driving electrode 1 in the fourth row and the corresponding ground line 4.

The value of the parasitic capacitance generated between each touch electrode and the line at the peripheral region mainly depends on the distance between the touch electrode and the line. When the line is of a substantially same line width, Ca1≈Cb1≈Cc1≈Cd1, Ca2≈Cb2≈Cc2≈d2 Ca3≈Cb3≈Cc3≈Cd3 and Ca4≈Cb4≈Cc4≈Cd4, so Ca≈Cb≈Cc≈Cd, i.e., the total parasitic capacitances generated between the driving electrodes 1 and the lines at the peripheral region at a right side may be substantially the same.

Identically, the total parasitic capacitances generated between the driving electrodes 1 and the lines at the peripheral region at a left side may also be substantially the same, and the total parasitic capacitances generated between the sensing electrodes 2 and the lines at the peripheral region at a lower side may also be substantially the same.

In the embodiments of the present disclosure, through the additional ground lines at the peripheral region, it is able to achieve the even arrangement of the lines at the peripheral region, thereby to adjust the difference between the parasitic capacitances generated between the lines at the peripheral region and each touch electrode, enable the total parasitic capacitances between the touch electrodes and the lines at the peripheral region to be substantially the same, and improve the linearity of the touch electrodes. In addition, as compared with the related art where merely one ground line is provided at the peripheral region, in the embodiments of the present disclosure, more ground lines may be provided, so as to increase the ESD capability of the touch substrate, thereby to improve an ESD resistance capability of the touch substrate.

When the touch electrode is of an OGM structure, it is able to improve such touch performance as flexibility of an active pen as well as linearity. Hence, in the embodiments of the present disclosure, each touch electrode may be of an OGM structure. Of course, apart from the OGM structure, each touch electrode may also be a block-like electrode made of a transparent conductive material, e.g., ITO.

The present disclosure further provides in some embodiments a display device, including the above-mentioned touch substrate. The display device may be any product or member having a display function, e.g., television, display, digital photo frame, mobile phone or flat-panel computer. The display device may further include a flexible circuit board, a printed circuit board and a back plate.

The present disclosure further provides a method for manufacturing a touch substrate. The touch substrate includes a touch region provided with touch electrodes, and a peripheral region surrounding the touch region, and the touch electrodes include a first touch electrode and a second touch electrode arranged at a periphery of the touch region at a same side. The method includes forming at least one line at the peripheral region and a same layer as the touch electrodes, so that an absolute value of a difference between a first total parasitic capacitance and a second total parasitic capacitance is smaller than or equal to a threshold. A sum of parasitic capacitances generated between the first touch electrode and the at least one line at an adjacent part of the peripheral region is the first total parasitic capacitance, and a sum of parasitic capacitances generated between the second touch electrode and the at least one line at the adjacent part of the peripheral region is the second total parasitic capacitance.

According to the embodiments of the present disclosure, the absolute value of the difference between the total parasitic capacitances generated between different touch electrodes and the at least one line at the peripheral region may be smaller than or equal to the threshold. As a result, it is able to reduce the difference between the parasitic capacitances generated between the lines at the peripheral region and the touch electrodes at the periphery of the touch region, i.e., to make the parasitic capacitances generated between the lines at the peripheral region and the touch electrodes at the periphery of the touch region to be substantially the same, thereby to improve the linearity of the touch electrodes at the periphery of the touch region of the touch substrate and improve the touch effect of the touch substrate.

The touch substrate in the embodiments of the present disclosure may be a mutually-capacitive touch substrate or a self-capacitive touch substrate. When the touch substrate is the mutually-capacitive touch substrate, the touch electrodes may include driving electrodes and sensing electrodes arranged at different layers. The method may include: forming at least one first line arranged at a same layer as the driving electrodes at the peripheral region, so that an absolute value of a difference between the first total parasitic capacitance of the first driving electrode at the periphery of the touch region and the second total parasitic capacitance of the second driving electrode at the periphery of the touch region at the same side is smaller than or equal to the threshold; and/or forming at least one second line arranged at a same layer as the sensing electrodes at the peripheral region, so that an absolute value of a difference between the first total parasitic capacitance of the first sensing electrode at the periphery of the touch region and the second total parasitic capacitance of the second sensing electrode at the periphery of the touch region at the same side is smaller than or equal to the threshold.

For example, the threshold may be 0.01 F, so as to make the parasitic capacitances generated between the lines at the peripheral region and the touch electrodes at the periphery of the touch region to be substantially the same, thereby to significantly improve the linearity of the touch electrodes at the periphery of the touch region and improve the touch effect of the touch substrate.

In some embodiments of the present disclosure, the total parasitic capacitances between all the touch electrodes at the periphery of the touch region at the same side and the at least one line at the peripheral region may be substantially the same.

In the embodiments of the present disclosure, all the lines may be arranged evenly at the peripheral region, i.e., distances between any two adjacent lines at the peripheral region may be substantially the same. Here, it should be appreciated that, when the distances are substantially the same, it means that they may be completely the same, or the difference between any two of them may be smaller than 5% or even 2%. Extension lines of all touch electrodes may cross the lines in a same amount in a direction away from a center of the touch region. In this way, through setting a size of each line and an interval between the adjacent lines, it is able to make the total parasitic capacitances generated between all the touch electrodes at the peripheral of the touch region at the same side and the lines at the peripheral region to be substantially the same, or even same.

In a possible embodiment of the present disclosure, the forming the at least one line arranged at a same layer as the touch electrodes at the peripheral region may include forming the lines crossing the extension line of each touch electrode in the direction away from the center of the touch region, and the extension line of each touch electrode may cross a same quantity of the lines.

When the touch electrode is of an OGM structure, it is able to improve such touch performance as flexibility of an active pen as well as linearity. Hence, in the embodiments of the present disclosure, each touch electrode may be of an OGM structure. Of course, apart from the OGM structure, each touch electrode may also be a block-like electrode made of a transparent conductive material, e.g., ITO.

When the touch electrode is of the OGM structure, the method may specifically include the following steps.

Step 1: providing a base substrate, and forming a black matrix (BM) on the base substrate. The base substrate may be a glass substrate, a polymer substrate or a quartz substrate, and the black matrix may cover a peripheral region of the base substrate.

Step 2: forming a first insulation layer covering the entire base substrate. The first insulation layer may be made of an oxide, a nitride or an oxynitride, with corresponding reactive gases of $SiH_4$, $NH_3$ or $N_2$, or $SiH_2Cl_2$, $NH_3$ or $N_2$. Through the first insulation layer, it is able to provide a flat surface for the subsequent processes.

Step 3: forming the sensing electrodes. A metal layer may be formed on the first insulation layer, and then patterned to form the sensing electrodes consisting of OGMs. When forming the sensing electrodes at the touch region through the metal layer, the signal lines may also be formed at the peripheral region through the metal layer. The signal lines may include the ground lines and the touch signal lines each connected to the corresponding sensing electrode. The signal lines may be arranged evenly at the peripheral region.

Step 4: forming a second insulation layer covering the entire base substrate. The second insulation layer may be made of an oxide, a nitride or an oxynitride, with corresponding reactive gases of $SiH_4$, $NH_3$ or $N_2$, or $SiH_2Cl_2$, $NH_3$ or $N_2$. The second insulation layer may, on one hand, serve as an insulation layer between the driving electrodes and the sensing electrodes, and on the other hand, provide a flat surface for the subsequent processes.

Step 5: forming the driving electrodes. A metal layer may be formed on the second insulation layer, and then patterned to form the driving electrodes consisting of OGMs. When forming the driving electrodes at the touch region through the metal layer, the signal lines may also be formed at the peripheral region through the metal layer. The signal lines may include the ground lines and the touch signal lines each connected to the corresponding driving electrode. The signal lines may be arranged evenly at the peripheral region.

Step 6: forming a third insulation layer covering the entire base substrate. The third insulation layer may be made of an oxide, a nitride or an oxynitride, with corresponding reactive gases of $SiH_4$, $NH_3$ or $N_2$, or $SiH_2Cl_2$, $NH_3$ or $N_2$. The third insulation layer may, on one hand, function as to protect the driving electrodes, and on the other hand, provide a flat surface for the subsequent processes.

In the embodiments of the present disclosure, the order of the steps shall not be limited to the serial numbers thereof. For a person skilled in the art, any change in the order of the steps shall also fall within the scope of the present disclosure if without any creative effort.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch substrate, comprising a touch region provided with touch electrodes, and a peripheral region surrounding the touch region and provided with at least one signal line arranged at a same layer as the touch electrodes, wherein the touch electrodes comprise a first touch electrode and a second touch electrode arranged at a periphery of the touch region at a same side, a sum of parasitic capacitances generated between the first touch electrode and the at least one signal line at an adjacent part of the peripheral region is a first total parasitic capacitance, a sum of parasitic capacitances generated between the second touch electrode and the at least one signal line at the adjacent part of the peripheral region is a second total parasitic capacitance, and an absolute value of a difference between the first total parasitic capacitance and the second total parasitic capacitance is smaller than or equal to a threshold;

wherein a quantity of signal lines crossing an extension line of each first touch electrode is the same as a quantity of signal lines crossing an extension line of each second touch electrode in a direction away from a center of the touch region;

the signal lines comprise at least one ground line and touch signal lines connected to each touch electrode, and the touch signal lines are connected to a touch circuit at the peripheral region;

the touch electrodes are arranged in n rows in a direction close to the touch circuit, and the signal lines crossing an extension line of the touch electrode in a $k^{th}$ row comprise n+1−k ground lines and k touch signal lines, where n is an integer greater than 1, and k is an integer greater than 0 and smaller than or equal to n; and/or the touch electrodes are arranged in m columns in the direction close to the touch circuit, and the signal lines crossing an extension line of the touch electrode in a $k^{th}$ column comprise m+1−k ground lines and k touch signal lines, where m is an integer greater than 1, and k is an integer greater than 0 and smaller than or equal to m.

2. The touch substrate according to claim 1, wherein the threshold is 0.01 F.

3. The touch substrate according to claim 1, wherein the total parasitic capacitances between all the touch electrodes at the periphery of the touch region at the same side and the at least one signal line at an adjacent part of the peripheral region are substantially the same.

4. The touch substrate according to claim 1, wherein the signal lines are evenly arranged at the peripheral region, and the adjacent signal lines are spaced apart from each other at a substantially same interval.

5. The touch substrate according to claim 1, wherein the n+1−k ground lines and the k touch signal lines comprise a first signal line, a second signal line, . . . , and an $(n+1)^{th}$ signal line sequentially in the direction away from the center of the touch region, a distance between each touch electrode and the corresponding first signal line is $d_1$, a distance between each touch electrode and the corresponding second signal line is $d_2$, . . . , and a distance between each touch electrode and the corresponding $(n+1)^{th}$ signal line is $d_{n+1}$, wherein the signal lines corresponding to each touch electrode cross the extension line of the touch electrode.

6. The touch substrate according to claim 1, wherein each touch electrode is of a One Glass Metal Mesh (OGM) structure.

7. A display device, comprising the touch substrate according to claim 1, a flexible circuit board, a printed circuit board and a back plate.

8. The touch substrate according to claim 1, wherein the touch electrodes comprise driving electrodes and sensing electrodes arranged at different layers, and the at least one signal line comprises at least one first signal line and at least one second signal line, wherein the peripheral region is provided with the at least one first signal line arranged at a same layer as the driving electrodes, the driving electrodes comprise a first driving electrode and a second driving electrode at the periphery of the touch region at a same side, and an absolute value of a difference between the first total parasitic capacitance of the first driving electrode and the second total parasitic capacitance of the second driving electrode is smaller than or equal to the threshold; and/or the peripheral region is provided with the at least one second signal line arranged at a same layer as the sensing electrodes, the sensing electrodes comprise a first sensing electrode and a second sensing electrode at the periphery of the touch region at a same side, and an absolute value of a difference between the first total parasitic capacitance of the first sensing electrode and the second total parasitic capacitance of the second sensing electrode is smaller than or equal to the threshold.

9. The touch substrate according to claim 8, wherein the total parasitic capacitances generated between the driving electrodes at the periphery of the touch region and the signal lines at a right part of the peripheral region are substantially the same.

10. The touch substrate according to claim 8, wherein the total parasitic capacitances generated between the driving electrodes at the periphery of the touch region and the signal lines at a left part of the peripheral region are substantially the same.

11. The touch substrate according to claim 8, wherein the total parasitic capacitances generated between the driving electrodes at the periphery of the touch region and the signal lines at a lower part of the peripheral region are substantially the same.

12. The touch substrate according to claim 1, wherein each touch electrode is a block-like electrode made of a transparent conductive material.

13. The touch substrate according to claim 12, wherein each touch electrode is a block-like electrode made of Indium Tin Oxide (ITO).

14. A method of manufacturing a touch substrate, wherein the touch substrate comprises a touch region provided with touch electrodes, and a peripheral region surrounding the touch region, and the touch electrodes comprise a first touch electrode and a second touch electrode arranged at a periphery of the touch region at a same side, wherein the method comprises:

forming at least one signal line at the peripheral region and a same layer as the touch electrodes, so that an absolute value of a difference between a first total parasitic capacitance and a second total parasitic capacitance is smaller than or equal to a threshold, and wherein a sum of parasitic capacitances generated between the first touch electrode and the at least one signal line at an adjacent part of the peripheral region is the first total parasitic capacitance, and a sum of parasitic capacitances generated between the second touch electrode and the at least one signal line at the adjacent part of the peripheral region is the second total parasitic capacitance;

wherein a quantity of signal lines crossing an extension line of each first touch electrode is the same as a quantity of signal lines crossing an extension line of each second touch electrode in a direction away from a center of the touch region;

the signal lines comprise at least one ground line and touch signal lines connected to each touch electrode, and the touch signal lines are connected to a touch circuit at the peripheral region;

the touch electrodes are arranged in n rows in a direction close to the touch circuit, and the signal lines crossing an extension line of the touch electrode in a $k^{th}$ row comprise n+1−k ground lines and k touch signal lines, where n is an integer greater than 1, and k is an integer greater than 0 and smaller than or equal to n; and/or the touch electrodes are arranged in m columns in the direction close to the touch circuit, and the signal lines crossing an extension line of the touch electrode in a $k^{th}$ column comprise m+1−k ground lines and k touch signal lines, where m is an integer greater than 1, and k is an integer greater than 0 and smaller than or equal to m.

\* \* \* \* \*